United States Patent
Hiwatashi et al.

(10) Patent No.: US 10,407,070 B2
(45) Date of Patent: Sep. 10, 2019

(54) CONTROL DEVICE FOR VEHICLE

(71) Applicant: MAZDA MOTOR CORPORATION, Hiroshima (JP)

(72) Inventors: Keiichi Hiwatashi, Hiroshima (JP); Daisuke Umetsu, Hiroshima (JP); Osamu Sunahara, Hiroshima (JP); Koichi Kimoto, Hiroshima (JP); Yasunori Takahara, Hiroshima (JP); Daisaku Ogawa, Hiroshima (JP); Chikako Ohisa, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 176 days.

(21) Appl. No.: 15/515,084

(22) PCT Filed: Sep. 9, 2016

(86) PCT No.: PCT/JP2016/076673
§ 371 (c)(1),
(2) Date: Mar. 28, 2017

(87) PCT Pub. No.: WO2018/047304
PCT Pub. Date: Mar. 15, 2018

(65) Prior Publication Data
US 2018/0345976 A1 Dec. 6, 2018

(51) Int. Cl.
*B60W 30/18* (2012.01)
*F02D 29/02* (2006.01)
(Continued)

(52) U.S. Cl.
CPC ....... *B60W 30/18145* (2013.01); *B60K 28/10* (2013.01); *B60W 30/02* (2013.01);
(Continued)

(58) Field of Classification Search
USPC .......................................................... 701/71
See application file for complete search history.

(56) References Cited

U.S. PATENT DOCUMENTS

| 5,197,008 A | 3/1993 | Itoh et al. |
| 5,216,608 A | 6/1993 | Ito et al. |

(Continued)

FOREIGN PATENT DOCUMENTS

| EP | 0441176 A1 | 8/1991 |
| JP | H04-219434 A | 8/1992 |

(Continued)

OTHER PUBLICATIONS

International Search Report issued in PCT/JP2016/076673; dated Nov. 15, 2016.
(Continued)

*Primary Examiner* — Tyler D Paige
(74) *Attorney, Agent, or Firm* — Studebaker & Brackett PC

(57) ABSTRACT

A control device for a vehicle includes: an engine (10); an engine torque adjustment mechanism for adjusting an output torque of the engine; and a PCM (50) configured, upon satisfaction of a vehicle attitude control executing condition that the vehicle is traveling and a steering angle-related value is increasing, to control the engine torque adjustment mechanism to reduce the engine torque to thereby generate deceleration of the vehicle so as to control vehicle attitude. The PCM (50) is further configured to set a rate of change in the engine output torque being reduced, such that the rate of change becomes larger as the number of times of combustion per unit time in the engine (10) becomes smaller, and to control the engine torque adjustment mechanism to reduce the engine output torque according to the rate of change set by the torque reduction change rate-setting part.

6 Claims, 8 Drawing Sheets

(51) Int. Cl.

| | | |
|---|---|---|
| *F02P 5/15* | (2006.01) | |
| *B60K 28/10* | (2006.01) | |
| *B60W 30/02* | (2012.01) | |
| *F02D 41/00* | (2006.01) | |
| *F02D 41/02* | (2006.01) | |
| *F02D 41/12* | (2006.01) | |
| *F02D 17/02* | (2006.01) | |

(52) U.S. Cl.
CPC ......... *F02D 29/02* (2013.01); *F02D 41/0087* (2013.01); *F02D 41/021* (2013.01); *F02P 5/15* (2013.01); *B60W 2510/0638* (2013.01); *B60W 2540/18* (2013.01); *B60W 2710/0672* (2013.01); *F02D 17/02* (2013.01); *F02D 41/12* (2013.01); *F02D 2200/101* (2013.01); *F02D 2200/1002* (2013.01); *F02D 2200/60* (2013.01); *F02D 2250/26* (2013.01)

(56) References Cited

U.S. PATENT DOCUMENTS

| | | |
|---|---|---|
| 5,253,172 A | 10/1993 | Ito et al. |
| 5,276,624 A | 1/1994 | Ito et al. |
| 5,309,362 A | 5/1994 | Ito et al. |
| 5,447,133 A | 9/1995 | Kamio et al. |
| 7,072,758 B2 * | 7/2006 | Kolmanovsky ........... F01L 9/04 123/198 F |
| 7,321,821 B2 * | 1/2008 | Kolmanovsky ........... F01L 9/04 123/478 |
| 9,702,315 B1 * | 7/2017 | Palmer .................... F02D 43/00 |
| 2005/0205063 A1 * | 9/2005 | Kolmanovsky ........... F01L 9/04 123/436 |
| 2006/0241847 A1 * | 10/2006 | Kolmanovsky ........... F01L 9/04 701/103 |
| 2008/0147302 A1 * | 6/2008 | Kolmanovsky ........... F01L 9/04 701/105 |
| 2015/0191168 A1 * | 7/2015 | Mitsuyasu ............ B60W 20/00 701/54 |
| 2018/0265118 A1 * | 9/2018 | Ogawa .................. B62D 5/0463 |
| 2018/0266345 A1 * | 9/2018 | Ogawa ............ B60W 30/18145 |
| 2018/0266346 A1 * | 9/2018 | Ogawa ................. F02D 41/021 |

FOREIGN PATENT DOCUMENTS

| | | |
|---|---|---|
| JP | 2000-337196 A | 12/2000 |
| JP | 2014-166014 A | 9/2014 |

OTHER PUBLICATIONS

Written Opinion issued in PCT/JP2016/076673; dated Nov. 15, 2016.

\* cited by examiner

FIG.6
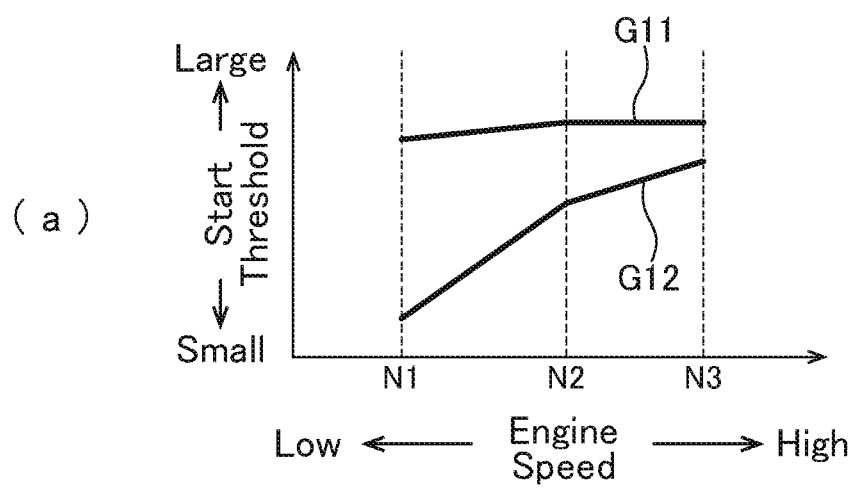
(a)
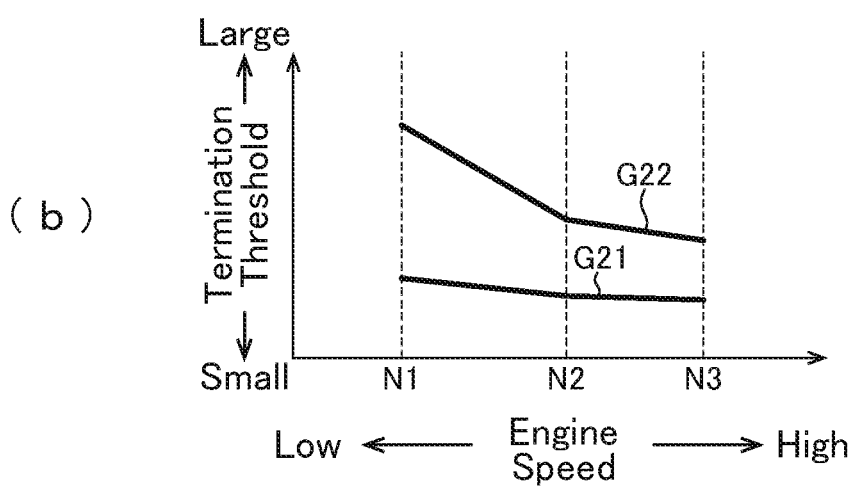
(b)

US 10,407,070 B2

CONTROL DEVICE FOR VEHICLE

TECHNICAL FIELD

The present invention relates to a control device for a vehicle, and more particularly to a control device for controlling an internal combustion engine of a vehicle to realize a desired vehicle attitude (vehicle behavior).

BACKGROUND ART

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust load to be applied to front road wheels as steerable road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable.

Further, there has been proposed a vehicle behavior control device operable to reduce a driving force for a vehicle according to yaw rate-related quantity corresponding to a steering wheel operation by a driver (e.g., yaw acceleration), thereby making it possible to quickly generate vehicle deceleration in response to start of the steering wheel operation by the driver and thus quickly apply a sufficient load to front road wheels as steerable road wheels (see, for example, the following Patent Document 1). In this vehicle behavior control device, in response to start of the steering wheel operation, load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsivity with respect to a turning operation of a steering wheel. This makes it possible to realize a vehicle behavior as intended by the driver.

CITATION LIST

Patent Document

Patent Document 1: JP 2014-166014 A

SUMMARY OF INVENTION

Technical Problem

Meanwhile, in the field of multi-cylinder internal combustion engines (i.e., internal combustion engines of a type having a plurality of cylinders), with a view to improving fuel economy, there has been known a technique of switching an engine operation mode between an all-cylinder operation in which combustion of an air-fuel mixture is performed in all of the plurality of cylinders and a reduced-cylinder operation in which a part of the plurality of cylinders are deactivated so as to cease combustion of an air-fuel mixture therein, according to a driving state of a vehicle equipped with the engine. In such an engine capable of performing the reduced-cylinder operation, i.e., in a cylinder deactivatable engine, during the reduced-cylinder operation, combustion is prohibited in two of the cylinders which are mutually non-consecutive in terms of combustion order (firing order) and is sequentially performed in the remaining cylinders. Therefore, a combustion interval during the reduced-cylinder operation becomes greater than that during the all-cylinder operation.

Thus, in the case where the control (vehicle attitude control) of reducing an engine torque so as to generate vehicle deceleration according to a steering wheel operation by a driver is performed in the cylinder deactivatable engine by using the vehicle behavior control device described in the Patent Document 1, there are some cases where a difference arises between the all-cylinder operation and the reduced-cylinder operation, in terms of a period of time from occurrence of a demand for torque reduction through until the first combustion timing since the occurrence of the demand comes in one of the cylinders, and the vehicle attitude control is actually started. Thus, when the engine operation mode is switched between the all-cylinder operation and the reduced-cylinder operation, a difference arises in terms of a timing at which a cornering force of the front road wheels is increased by the reduction in engine torque, a timing at which a reaction force to a steering wheel is increased in response to the increase in the cornering force and the like, possibly causing a difference in vehicle behavior, and a feeling of strangeness to a driver.

Although the above description has been made based on one example where the deterioration in responsivity of torque reduction to a demand for executing (starting) the vehicle attitude control occurs during the reduced-cylinder operation in the cylinder deactivatable engine, such a problem also tends to occur under an engine operating condition that the number of times of combustion per unit time is relatively small (e.g., in a low engine speed range), not only during the reduced-cylinder operation in the cylinder deactivatable engine.

The present invention has been made in order to solve the above conventional problem, and an object thereof is to provide a control device for a vehicle, which is capable of changing a rate of change in engine torque in a starting stage of vehicle attitude control, depending on the number of times of combustion per unit time in an engine mounted in the vehicle, to adequately suppress deterioration in responsivity of torque reduction in the starting stage of the vehicle attitude control.

Solution to Technical Problem

In order to achieve the above object, according to a first aspect of the present invention, there is provided a control device for a vehicle, comprising: an engine; an engine torque adjustment mechanism configured to adjust an output torque of the engine; and a vehicle attitude control part configured, upon satisfaction of a condition that the vehicle is traveling, and that a steering angle-related value pertaining to a steering angle of a steering system is increasing, to control the engine torque adjustment mechanism to reduce the engine output torque to thereby generate deceleration of the vehicle so as to control vehicle attitude, wherein the control device further comprises a torque reduction change rate-setting part configured to set a rate of change in the engine output torque being reduced, such that the rate of change becomes larger as the number of times of combustion per unit time in the engine becomes smaller, and wherein the vehicle attitude control part is configured to control the engine torque adjustment mechanism to reduce the engine output torque according to the rate of change set by the torque reduction change rate-setting part.

In the control device according to the first aspect of the present invention, as the number of times of combustion per unit time in the engine becomes smaller, the rate (rapidity) of change in the engine torque being reduced is set to become larger, i.e., an engine torque reduction amount per unit time is increased, so that it is possible to quickly reduce the engine torque in a starting stage of the vehicle attitude control. Therefore, in the first aspect of the present invention, it becomes possible to adequately suppress deterioration in responsivity of torque reduction in the starting stage of the vehicle attitude control, in the driving state in which the number of times of combustion per unit time in the engine is relatively small. Thus, it becomes possible to prevent delay in a timing at which a cornering force of front road wheels is increased by the reduction in the engine torque, a timing at which a reaction force to a steering wheel is increased in response to the increase in the cornering force and the like.

Preferably, in the first aspect of the present invention, the engine is provided with a plurality of cylinders and capable of performing a reduced-cylinder operation in which a part of the plurality of cylinders are deactivated so as to cease combustion therein, and the torque reduction change rate-setting part is configured to set the rate of change in the engine output torque being reduced, such that the rate of change becomes larger as the number of deactivated cylinders among the plurality of cylinders becomes larger.

According to this feature, it is possible to determine the number of times of combustion per unit time in the engine, based on the number of cylinders to be deactivated in the reduced-cylinder operation (number of deactivated cylinders), and adequately set the rate of change in the engine output torque being reduced, depending on the determined number of deactivated cylinders.

Preferably, in the first aspect of the present invention, the vehicle is further equipped with an engine speed detection device configured to detect an engine speed of the engine, and the torque reduction change rate-setting part is configured to set the rate of change in the engine output torque being reduced, such that the rate of change becomes larger as the engine speed becomes lower.

According to this feature, it is possible to determine the number of times of combustion per unit time in the engine, based on a current engine speed, and set the rate of change in the engine output torque being reduced to an adequate value.

Preferably, in the first aspect of the present invention, the vehicle is further equipped with a steering angle sensor configured to detect a steering angle of the steering system, and the vehicle attitude control part is configured to employ, as the sub-condition that the steering angle-related value is increasing, a condition that a rate of change in a steering angle detected by the steering angle sensor is equal to or greater than a given value.

According to a second aspect of the present invention, there is provided a control device for a vehicle, comprising: an engine; an engine torque adjustment mechanism configured to adjust an output torque of the engine; and a vehicle attitude control part configured, upon satisfaction of a condition that the vehicle is traveling, and that a steering angle-related value pertaining to a steering angle of a steering system is increasing, to control the engine torque adjustment mechanism to reduce the engine output torque to thereby generate deceleration of the vehicle so as to control vehicle attitude, wherein the control device further comprises a torque reduction change rate-setting part configured, when the number of times of combustion per unit time in the engine is a first value, to set a rate of change in the engine output torque being reduced, such that the rate of change becomes larger, as compared with when the number of times of combustion per unit time in the engine is a second value greater than the first value, and wherein the vehicle attitude control part is configured to control the engine torque adjustment mechanism to reduce the engine output torque according to the rate of change set by the torque reduction change rate-setting part.

In the second aspect of the present invention, it also becomes possible to adequately suppress deterioration in responsivity of torque reduction in the starting stage of the vehicle attitude control, in the driving state in which the number of times of combustion per unit time in the engine is relatively small.

According to a third aspect of the present invention, there is provided a control device for a vehicle, comprising: an engine; an engine torque adjustment mechanism configured to adjust an output torque of the engine; and a vehicle attitude control part configured, upon satisfaction of a condition that the vehicle is traveling, and that a steering angle-related value pertaining to a steering angle of a steering system is increasing, to control the engine torque adjustment mechanism to reduce the engine output torque to thereby generate deceleration of the vehicle so as to control vehicle attitude; wherein the engine is provided with a plurality of cylinders and capable of switchably performing one of a reduced-cylinder operation in which a part of the plurality of cylinders are deactivated so as to cease combustion therein, and an all-cylinder operation in which combustion is performed in all of the plurality of cylinders, wherein the control device further comprises a torque reduction change rate-setting part configured, when the engine is performing the reduced-cylinder operation, to set a rate of change in the engine output torque being reduced, such that the rate of change becomes larger, as compared to when the engine is performing the all-cylinder operation, and wherein the vehicle attitude control part is configured to control the engine torque adjustment mechanism to reduce the engine output torque according to the rate of change set by the torque reduction change rate-setting part.

In the third aspect of the present invention, it also becomes possible to adequately suppress deterioration in responsivity of torque reduction in the starting stage of the vehicle attitude control, during the reduced-cylinder operation.

Effect of Invention

The control device of the present invention makes it possible to change the rate of change in the engine torque in the starting stage of the vehicle attitude control, depending on the number of times of combustion per unit time in the engine, to adequately suppress deterioration in responsivity of torque reduction in the starting stage of the vehicle attitude control.

BRIEF DESCRIPTION OF DRAWINGS

FIGS. 6(a) and 6(b) are maps each defining a start threshold and a termination threshold of vehicle attitude control, in this embodiment.

DESCRIPTION OF EMBODIMENTS

With reference to the accompanying drawings, a control device for a vehicle, according to one embodiment of the present invention, will now be described.

<System Configuration>

Figure 1:
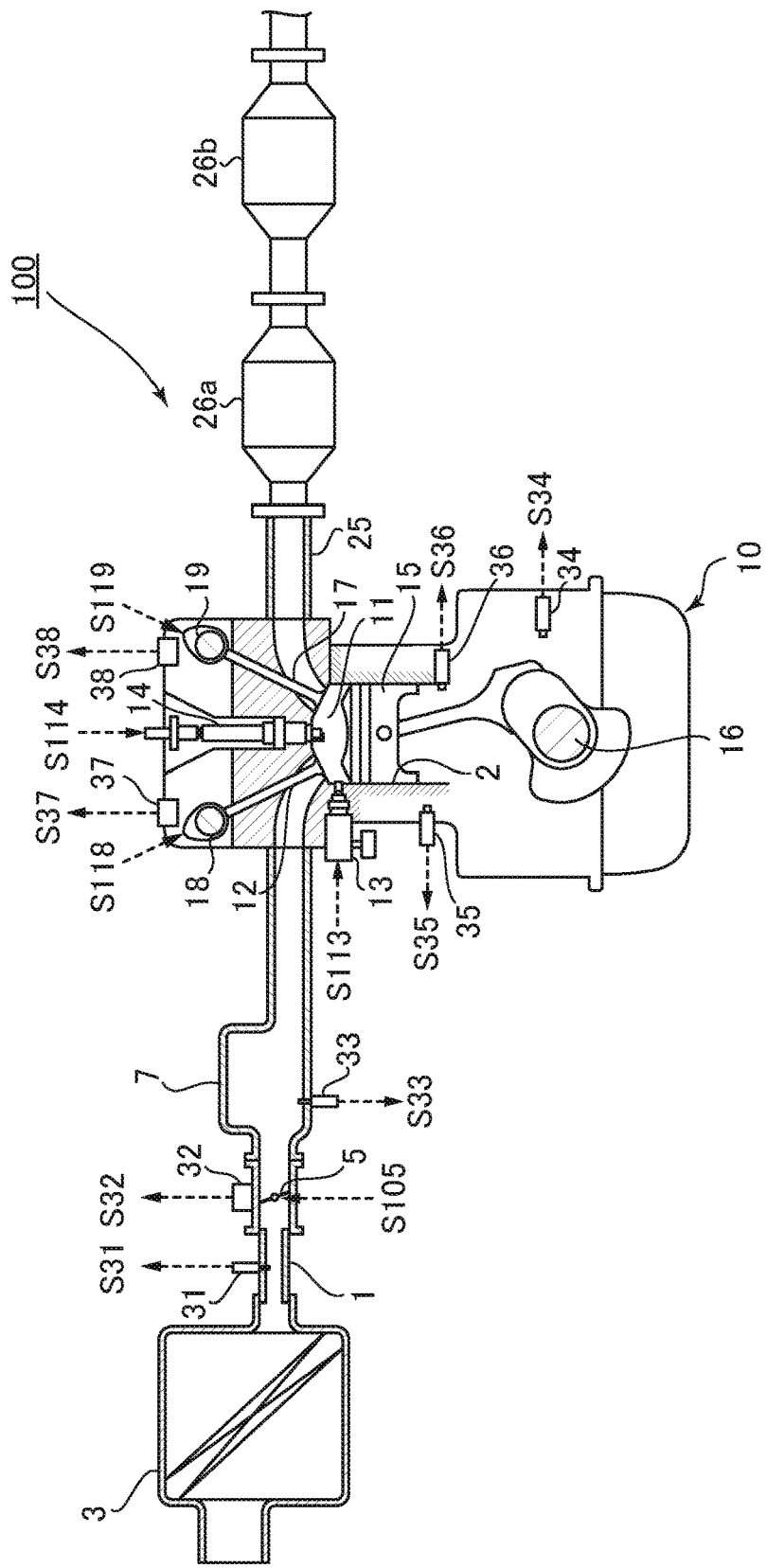
FIG. 1 is a schematic diagram depicting a configuration of an engine control system employing a control device for a vehicle, according to one embodiment of the present invention.
Figure 2:
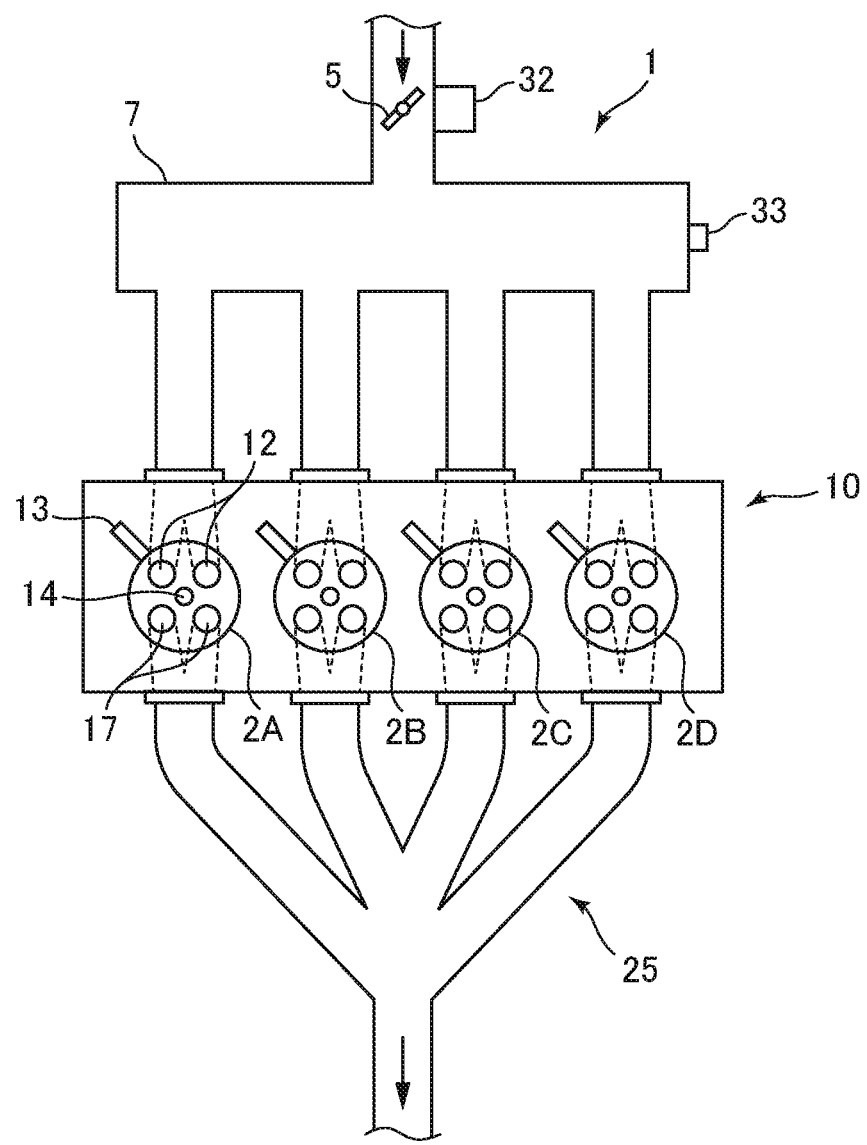
FIG. 2 is a schematic top plan view of an engine in to this embodiment.
Figure 3:
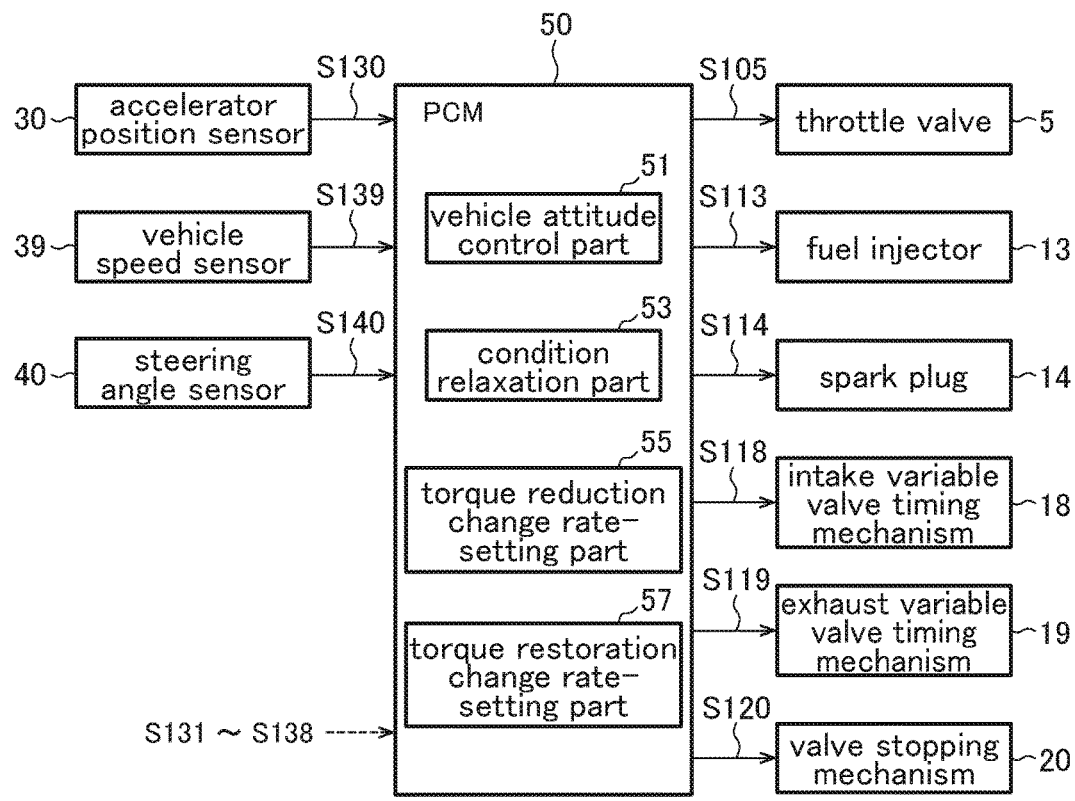
FIG. 3 is a block diagram depicting an electrical configuration of the engine control system employing the control device according to this embodiment.

First of all, an engine control system employing the control device according to this embodiment will be described with reference to FIGS. 1 to 3. FIG. 1 is a schematic diagram depicting a configuration of the engine control system employing the control device according to this embodiment. FIG. 2 is a schematic top plan view of an engine in this embodiment. FIG. 3 is a block diagram depicting an electrical configuration of the engine control system employing the control device according to this embodiment.

As depicted in FIGS. 1 to 3, the engine control system 100 primarily comprises: an internal combustion engine 10 (specifically, gasoline engine) comprising an intake passage 1 for allowing intake air (air) introduced from outside to pass therethrough, an engine body for generating a vehicle driving force through combustion of a mixture of intake air supplied from the intake passage 1 and fuel supplied from an aftermentioned fuel injector 13, and an exhaust passage 25 for discharging exhaust gas produced by the combustion within the engine body; a plurality of sensors 30 to 40 for detecting various states pertaining to control of the engine 10; and a PCM 50 (Power-train Control Module) for controlling an entirety of the engine 10.

The intake passage 1 is provided with an air cleaner 3 for cleaning intake air introduced from outside, a throttle valve 5 for adjusting an amount of intake air passing therethrough (intake air amount), and a surge tank 7 for temporarily reserving intake air to be delivered to the engine body, which are arranged in this order from the side of an upstream end of the intake passage 1.

As depicted in FIG. 2, the engine 10 in this embodiment is an in-line four-cylinder gasoline engine having four cylinders 2 (2A to 2D) arranged side-by-side linearly. The engine body of the engine 10 is primarily provided with: an intake valve 12 for selectively introducing intake air from the intake passage 1 into a combustion chamber 11; a fuel injector 13 for injecting fuel toward the combustion chamber 11; a spark plug 14 for igniting a mixture of the intake air and the fuel delivered and supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging exhaust gas produced by the combustion of the air-fuel mixture within the combustion chamber 11, to the exhaust passage 25.

The piston 15 is provided in each of the cylinders 2A to 2D, wherein the engine 10 is configured such that the four pistons 15 are reciprocatingly moved with a phase difference of 180 degrees crank angle (180° CA). Correspondingly, ignition timings in the cylinders 2A to 2D are set such that they are sequentially shifted in phase by 180° CA.

The engine 10 in this embodiment is a cylinder deactivatable engine capable of performing an operation in which two of the four cylinders 2A to 2D are deactivated and the remaining two cylinders are activated, i.e., a reduced-cylinder operation.

Specifically, assuming that the cylinder 2A, the cylinder 2B, the cylinder 2C and the cylinder 2D arranged in this order rightwardly in FIG. 2 are defined, respectively, as a first cylinder, a second cylinder, a third cylinder and a fourth cylinder, ignition (firing) is performed in the following order: the first cylinder 2A→the third cylinder 2C→the fourth cylinder 2D→the second cylinder 2B, during an all-cylinder operation in which all of the four cylinders 2A to 2D are activated.

On the other hand, during the reduced-cylinder operation, an ignition operation of the spark plugs 14 is prohibited in two of the cylinders which are mutually non-consecutive in terms of a firing order (combustion order) (in this embodiment, the first cylinder 2A and the fourth cylinder 2D), and alternately performed in the remaining two cylinders (i.e., the third cylinder 2C and the second cylinder 2B).

The engine 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, any of various heretofore-known types may be applied. For example, a variable valve timing mechanism of an electromagnetic type or a hydraulic type may be employed to variably control the operation timings of the intake valve 12 and the exhaust valve 17.

The engine 10 further comprises a valve stopping mechanism 20 for stopping opening and closing operations of the intake valves 12 and the exhaust valves 17 in the first and fourth cylinders 2A, 2D, during the reduced-cylinder operation. For example, the valve stopping mechanism 20 is constructed such that it comprises a so-called lost motion mechanism interposed between a cam and a valve and operable to selectively enable and disable a driving force of the cam to be transmitted to the valve. Alternatively, the valve stopping mechanism 20 may be constructed such that it comprises a so-called cam shifting mechanism operable to selectively transmit one of operating states of two first and second cams having different cam profiles, wherein the first cam has a cam profile capable of enabling opening and closing operation of a valve, and the second cam has a cam profile capable of stopping the opening and closing operation of the valve.

The exhaust passage 25 is provided with a plurality of exhaust gas purifying catalysts 26a, 26b having exhaust gas purifying functions, such as a NOx catalyst, a three-way catalyst and an oxidation catalyst. In the following description, when the exhaust gas purifying catalysts 26a, 26b are generically used without being functionally distinguished from each other, they will be described as "exhaust gas purifying catalyst 26".

As mentioned above, the engine control system 100 comprises a plurality of sensors 30 to 40 for detecting various states pertaining to control of the engine 10. Specifically, these sensors 30 to 40 are as follows. The sensor 30 is an accelerator position sensor for detecting an accelerator position, i.e., an angular position of a non-depicted accelerator pedal (which is equivalent to an amount of depression of the accelerator pedal manipulated by a driver). The sensor 31 is an airflow sensor for detecting an intake air amount which is equivalent to a flow rate of intake air passing through the intake passage 1. The sensor 32 is a throttle opening sensor for detecting a throttle opening which is an opening degree of the throttle valve 5. The sensor 33 is a pressure sensor for detecting an intake manifold pressure (internal pressure of an intake manifold) which is equivalent to a pressure of intake air supplied to the engine body. The sensor 34 is a crank angle sensor for detecting a crank angle of the crankshaft 16. The sensor 35 is a water temperature sensor for detecting a water temperature which is a temperature of cooling water for cooling the engine 10. The sensor 36 is an in-cylinder temperature sensor for detecting an in-cylinder temperature which is an internal temperature of each cylinder 2 of the engine 10. The sensors 37 and 38 are, respectively, an intake-side cam angle sensor for detecting operation timings of the intake valve 12 including a valve-close timing, and an exhaust-side cam angle sensor for detecting operation timings of the exhaust valve 17 including a valve-close timing. The sensor 39 is a vehicle speed sensor for detecting a speed of a vehicle equipped with the engine 10 (vehicle speed). The sensor 40 is a steering angle sensor for detecting, as a steering angle, a rotational angle of a steering wheel (not depicted). The above sensors 30 to 40 are operable to output, to the PCM 50, detection signals S130 to S140 corresponding to detected parameters, respectively.

Based on the detection signals S130 to S140 input from the sensors 30 to 40, the PCM 50 is operable to perform controls for various components of the engine 10. Specifically, as depicted in FIG. 3, the PCM 50 is operable to: supply a control signal S105 to the throttle valve 5 to control of opening and closing timings and the throttle opening of the throttle valve 5; supply a control signal S113 to the fuel injector 13 to control a fuel injection amount and a fuel injection timing; supply a control signal S114 to the spark plug 14 to control an ignition timing; supply control signals S118, S119, respectively, to the intake variable valve timing mechanism 18 and the exhaust variable valve timing mechanism 19 to control the operation timings of the intake valve 12 and the exhaust valve 17; and supply a control signal S120 to the valve stopping mechanism 20 to control deactivation/activation of the opening and closing operations of the intake valves 12 and the exhaust valves 17 in the first and fourth cylinders 2A, 2D.

Each of the throttle valve 5, the fuel injector 13, the spark plug 14, the intake variable valve timing mechanism 18 and the exhaust variable valve timing mechanism 19 is an example of an "engine torque control (hardware) mechanism" set forth in the appended claims.

In this embodiment, as depicted in FIG. 3, the PCM 50 comprises functional elements as described below. As a first functional element, the PCM 50 comprises a vehicle attitude control part 51 operable, upon satisfaction of a condition (condition for starting or executing vehicle attitude control (vehicle attitude control starting/executing condition)) that the vehicle is traveling, and a steering angle-related value (typically steering speed) pertaining to a steering angle of a steering wheel is increasing, to reduce the engine torque to thereby generate vehicle deceleration to execute the vehicle attitude control for controlling vehicle attitude. The vehicle attitude control part 51 is also operable, upon satisfaction of a given condition for terminating the vehicle attitude control (vehicle attitude control terminating condition), to control the engine 10 to restore the reduced engine torque to an original engine torque before the execution of the vehicle attitude control.

The PCM 50 also comprises a condition relaxation part 53 operable to relax each of the vehicle attitude control starting condition and the vehicle attitude control terminating condition to a larger degree, as the number of times of combustion per unit time in the engine 10 becomes larger. Specifically, the condition relaxation part 53 is operable to change a given parameter defining the vehicle attitude control starting condition so as to facilitate start of the vehicle attitude control, and change a given parameter defining the vehicle attitude control terminating condition so as to facilitate termination of the vehicle attitude control.

Further, the PCM 50 comprises a torque reduction change rate-setting part 55 operable to set a rate (rapidity) of change in the engine torque being reduced in a starting stage of the vehicle attitude control, such that it becomes larger, i.e., to set an engine torque reduction amount per unit time such that it becomes larger, as the number of times of combustion per unit time in the engine 10 becomes smaller. The vehicle attitude control part 51 is operable to control the engine 10 (engine torque adjustment mechanism) to reduce the engine torque according to the rate of change set in the above manner by the torque reduction change rate-setting part 55. Further, the PCM 50 comprises a torque restoration change rate-setting part 57 operable to set a rate of change in the engine torque being restored (increased) in a terminating stage of the vehicle attitude control, such that it becomes larger, i.e., to set an engine torque increase amount per unit time such that it becomes larger, as the number of times of combustion per unit time in the engine 10 becomes smaller. The vehicle attitude control part 51 is operable to control the engine 10 (engine torque adjustment mechanism) to start to restore the engine torque according to the change rate set in the above manner by the torque restoration change rate-setting part 57.

The above elements or parts of the PCM 50 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Figure 4:
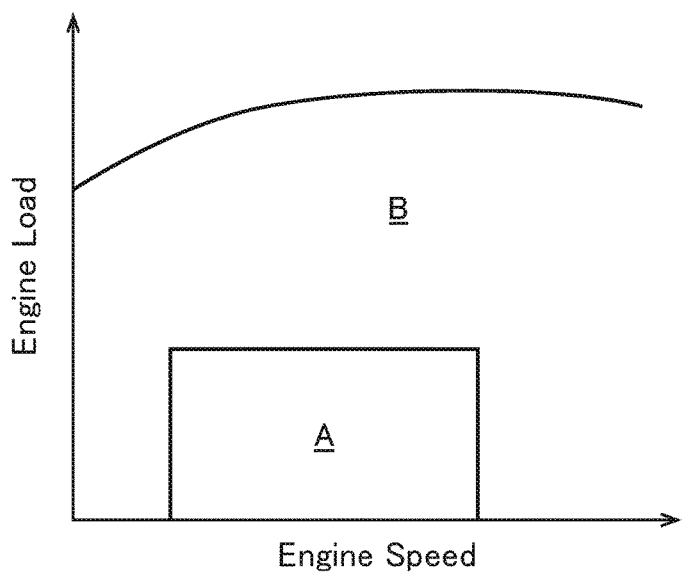
FIG. 4 is a map conceptually depicting two engine operating regions in which an engine operating mode is switched, in this embodiment.

Here, with reference to FIG. 4, two engine operating regions in which the reduced-cylinder operation and the all-cylinder operation are to be performed, respectively, in this embodiment, will be described. FIG. 4 is a map conceptually depicting two engine operating regions in which an engine operating mode is switched, in this embodiment. In FIG. 4, the horizontal axis represents engine speed, and the vertical axis represents engine load. As depicted in FIG.

4, a reduced-cylinder operation region A in which the reduced-cylinder operation is to be performed is set in a range having a relatively low engine speed and a relatively low engine load, and an all-cylinder operation region B in which the all-cylinder operation is to be performed is set in a range other than the reduced-cylinder operation region A. The PCM 50 is operable, referring to the map, to determine whether a current operating point defined by a current engine speed and a current engine load falls within the reduced-cylinder operation region A or the all-cylinder operation region B, and, depending on a result of the determination, controllably deactivate or activate the opening and closing operations of the intake valves 12 and the exhaust valves 17 in the first and fourth cylinders 2A, 2D so as to execute one of the reduced-cylinder operation and the all-cylinder operation.

<Details of Control in this Embodiment>

Next, with reference to FIGS. 5 to 9, control to be performed by the control device according to this embodiment will be described.

Figure 5:
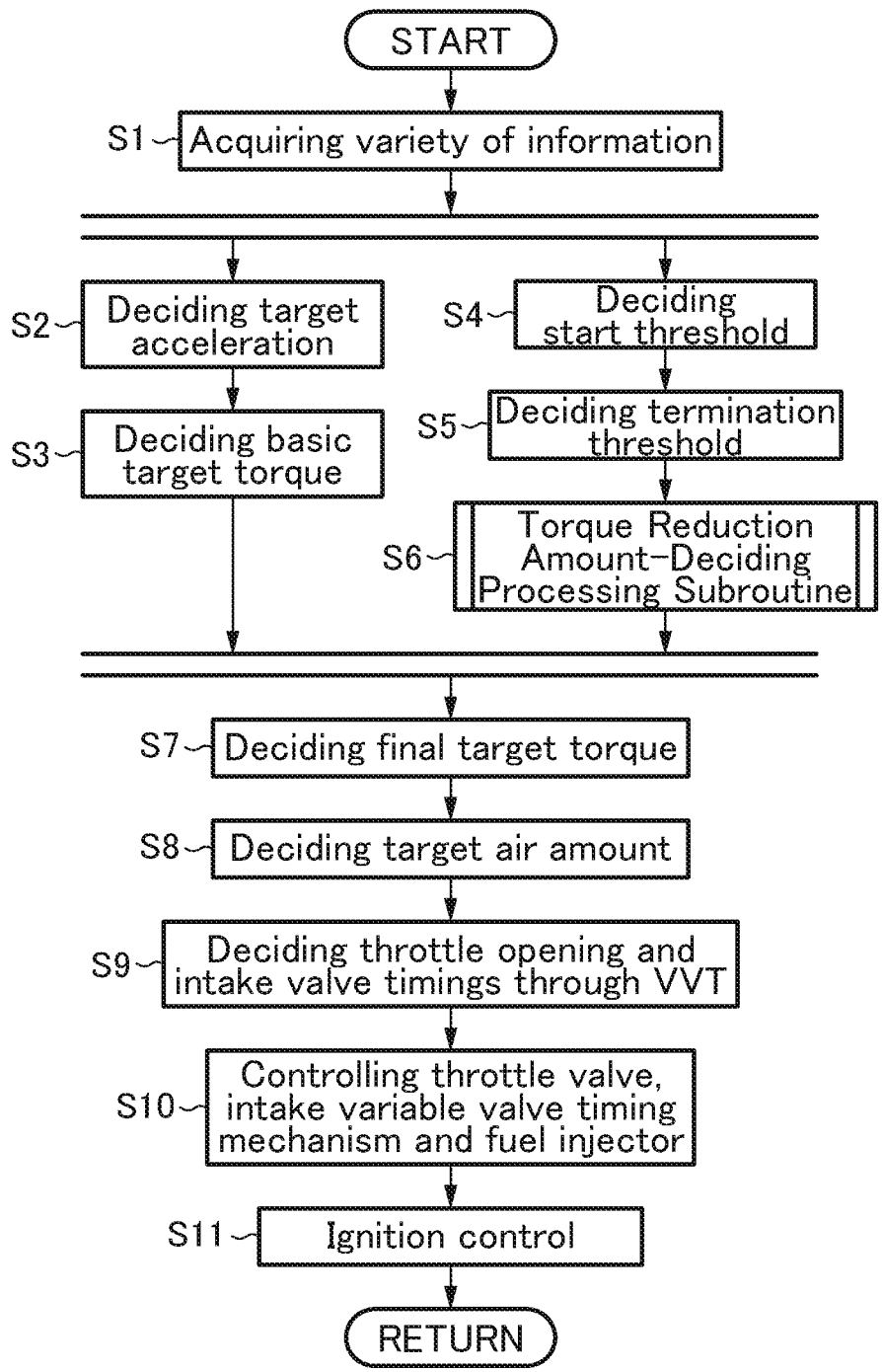
FIG. 5 is a flowchart of an engine control processing routine in this embodiment.
Figure 7:
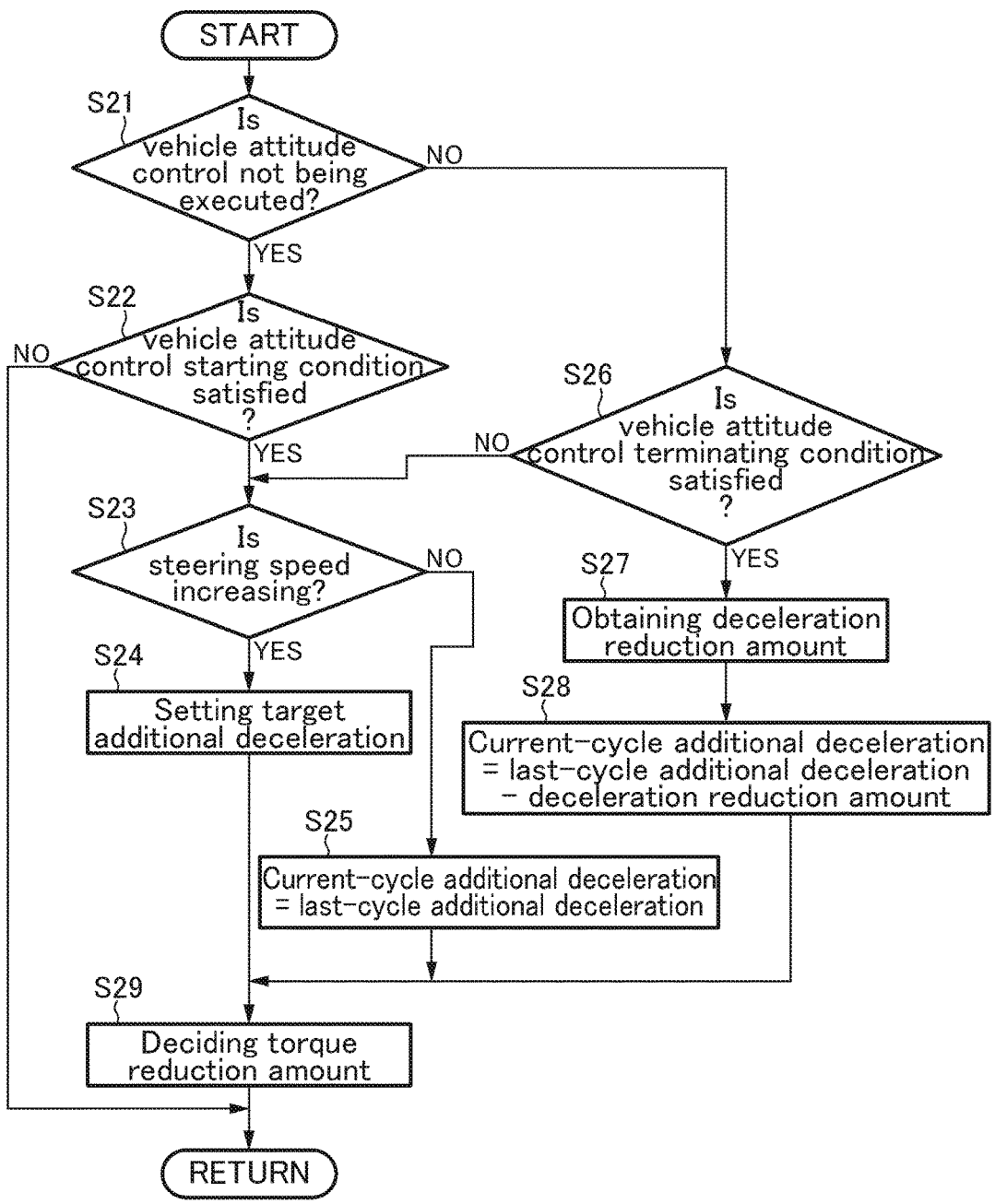
FIG. 7 is a flowchart of a torque reduction amount-deciding processing subroutine in this embodiment.
Figure 8:
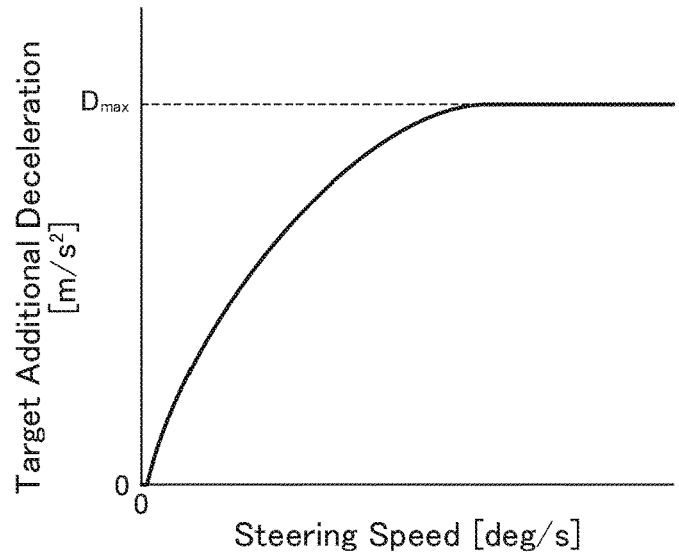
FIG. 8 is a map presenting a relationship between target additional deceleration and steering speed in this embodiment.
Figure 9:
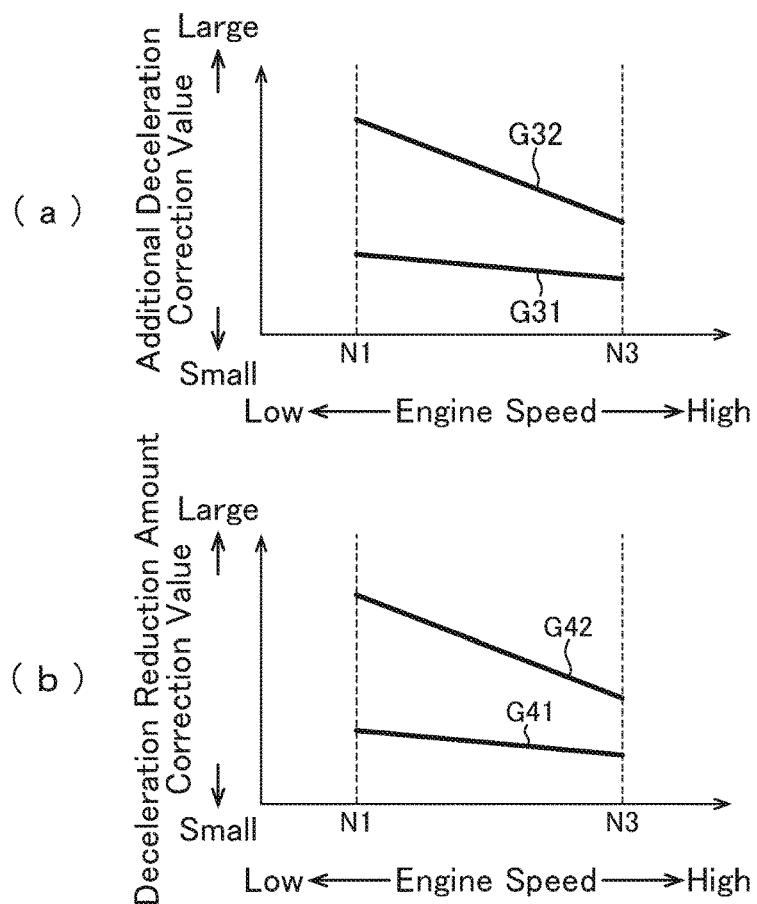
FIGS. 9(a) and 9(b) are maps for correcting deceleration, in this embodiment.

FIG. 5 is a flowchart of an engine control processing routine in this embodiment. FIGS. 6(*a*) and 6(*b*) are maps each defining a start threshold and a termination threshold of vehicle attitude control, in this embodiment. FIG. 7 is a flowchart of a torque reduction amount-deciding processing subroutine in this embodiment. FIG. 8 is a map depicting a relationship between target additional deceleration and steering speed in this embodiment. FIGS. 9(*a*) and 9(*b*) are maps for correcting deceleration, in this embodiment.

The engine control processing routine in FIG. 5 is activated when an ignition switch of the vehicle is turned on to apply power to the PCM 50, and repeatedly executed with a given cycle period. Further, this engine control processing routine is basically executed during traveling of the vehicle.

As depicted in FIG. 5, upon start of the engine control processing routine, in step S1, the PCM 50 operates to acquire information about a driving state of the vehicle. Specifically, the PCM 50 operates to acquire, as information about a driving state of the vehicle, detection signals S130 to S140 output from the aforementioned sensors 30 to 40, including an accelerator position detected by the accelerator position sensor 30, a vehicle speed detected by the vehicle speed sensor 39, a steering angle detected by the steering angle sensor 40, and a speed stage currently set in an automatic transmission of the vehicle. The PCM 50 also operates to, based on a current engine speed and a current engine load detected, respectively, by an engine speed sensor and an engine load sensor (not depicted), determine which of two operation modes consisting of the reduced-cylinder operation and the all-cylinder operation the engine 10 is performing, and acquire this engine operation mode as one driving state. In this case, the PCM 50 operates to determine the engine operation mode with reference to the map in FIG. 4.

Subsequently, in step S2, the PCM 50 operates to set a target acceleration, based on the driving state of the vehicle including an accelerator pedal operation state, acquired in the step S1. Specifically, the PCM operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the PCM 50 operates to decide a basic target torque of the engine 10 for realizing the target acceleration decided in the step S2. In this processing, the PCM 50 operates to decide the basic target torque within a torque range outputtable by the engine 10, based on current vehicle speed, speed stage, road gradient, road surface mu (µ), etc.

In parallel with the processings in the steps S2 and S3, processings in step S4 to S6 are performed. Specifically, based on a current engine speed and a current engine operation mode (the reduced-cylinder operation or the all-cylinder operation), the PCM 50 operates to decide a start threshold defining the vehicle attitude control starting condition, in the step S4, and then decide a termination threshold defining the vehicle attitude control terminating condition, in the step S5. These thresholds are criteria for determining a rate of change in steering speed when the vehicle attitude control is started and terminated (determination of the rate of change in steering speed is performed through an aftermentioned torque reduction amount-deciding processing subroutine). Here, with reference to FIGS. 6(*a*) and 6(*b*), the start threshold and the termination threshold will be specifically described.

FIG. 6(*a*) is a map defining a relationship between engine speed (horizontal axis) and start threshold (vertical axis), and FIG. 6(*b*) is a map defining a relationship between engine speed (horizontal axis) and terminal threshold (vertical axis). In FIGS. 6(*a*) and 6(*b*), the lines G11, G21 represent map data to be applied to the all-cylinder operation, and the lines G12, G22 represent map data to be applied to the reduced-cylinder operation.

As depicted in FIG. 6(*a*), in this embodiment, the start threshold is set such that it becomes smaller as the engine speed becomes lower. In addition, the start threshold in the reduced-cylinder operation is set to a value less than that in the all-cylinder operation. Further, the vehicle attitude control starting condition is configured to be satisfied when the rate of change in steering speed is equal to or greater than the start threshold. Thus, when the start threshold is set to a smaller value, the rate of change in steering speed becomes more likely to reach a value equal to or greater than the start threshold, so that the vehicle attitude control starting condition is relaxed. In this embodiment, when the engine speed is relatively low and the engine operation mode is the reduced-cylinder operation, i.e., the number of times of combustion per unit time in the engine 10 is relatively small, the start threshold is set to a relatively small value to relax the vehicle attitude control starting condition so as to suppress deterioration in responsivity of torque reduction in the starting stage of the vehicle attitude control.

Further, as depicted in FIG. 6(*b*), in this embodiment, the termination threshold is set such that it becomes larger as the engine speed becomes lower. In addition, the termination threshold in the reduced-cylinder operation is set to a value greater than that in the all-cylinder operation. Further, the vehicle attitude control terminating condition is configured to be satisfied when the rate of change in steering speed is less than the termination threshold. Thus, when the termination threshold is set to a larger value, the rate of change in steering speed becomes more likely to reach a value less than the termination threshold, so that the vehicle attitude control terminating condition is relaxed. In this embodiment, when the engine speed is relatively low and the engine operation mode is the reduced-cylinder operation, i.e., the number of times of combustion per unit time in the engine 10 is relatively small, the termination threshold is set to a relatively large value to relax the vehicle attitude control terminating condition so as to suppress deterioration in responsivity of torque restoration in the terminating stage of the vehicle attitude control.

In FIGS. 6(a) and 6(b), as to the engine speed, N1 is set to a value greater than at least an idle speed. Basically, the PCM 50 is configured such that it does not execute the vehicle attitude control in an engine operating region where the engine speed is less than N1 (because it does not make much sense to execute the vehicle attitude control in such a region). Further, N3 is set to a value, wherein, in an engine operating region where the engine speed is equal to greater than the value, an advantageous effect is not sufficiently brought out even if the start threshold and the termination threshold are changed according to the engine speed. For example, the engine speed N1 and the engine speed N3 are set, respectively, in the range of about 700 to 1200 rpm and in the range of about 2800 to 3200 rpm, and N2 located between N1 and N3 is set in the range of about 1800 to 2200 rpm. These engine speeds N1, N3 are also applied to aftermentioned maps in FIGS. 9(a) and 9(b).

In FIGS. 6(a) and 6(b), each of the start threshold and the termination threshold is continuously changed according to the engine speed. Alternatively, each of the start threshold and the termination threshold may be changed in a stepwise manner, according to the engine speed. As one example, each of the start threshold and the termination threshold may be changed in a stepwise manner, depending on whether the engine speed is less than a given value or equal to or greater than the given value.

Returning to FIG. 5, in step S6, the PCM 50 operates to execute a torque reduction amount-deciding processing subroutine for deciding a torque reduction amount in the above torque reduction control (vehicle attitude control), based on a steering angle of the steering wheel detected by the steering angle sensor 40. Details of the torque reduction amount-deciding processing subroutine will be described later.

Subsequently, the PCM 50 operates to subtract a torque reduction amount decided through the torque reduction amount-deciding processing subroutine in the step S6, from the basic target torque decided in the step S3 to thereby decide a final target torque.

Subsequently, the processing routine proceeds to step S8. In the step S8, the PCM 50 operates to decide a target air amount and a target fuel amount which are required for the engine 10 to output the final target torque decided in the step S7. As used herein, the term "air amount" means an amount of air to be introduced into the combustion chamber 11 of the engine 10. It is to be understood that non-dimensional charging efficiency may be used in place of the air amount. Specifically, the PCM 50 operates to calculate a target indicated torque based on the final target torque and by additionally taking into consideration a loss torque due to friction loss and pumping loss, and calculate a target fuel amount required for generating the target indicated torque, and, based on the calculated target fuel amount and a target equivalent ratio, to decide a target air amount.

Subsequently, in step S9, the PCM 50 operates to decide an opening degree of the throttle valve 5, and opening and closing timings of the intake valve 12 through the intake variable valve timing mechanism 18, while taking into account the air amount detected by the airflow sensor 31, so as to enable air to be introduced into the engine body in an amount equal to the target air amount decided in the step S8.

Subsequently, in step S10, the PCM 50 operates to control the throttle valve 5 and the intake variable valve timing mechanism 18, based on the throttle opening and the opening and closing timings of the intake valve 12 set in the step S9, and control the fuel injector 13, based on the target fuel amount calculated in the step S8.

Subsequently, in the step S11, the PCM 50 operates to, based on the final target torque decided in the step S7 and an actual air amount actually introduced into the combustion chamber 11 by controlling the throttle valve 5 and the intake variable valve timing mechanism 18 in the step S9, set an ignition timing for causing the engine 10 to output the decided final target torque, and control an ignition timing adjustment device for adjusting an ignition timing of the spark plug 14 so as to perform ignition at the ignition timing decided in the step S11. After the step S11, the PCM 50 terminates the engine control processing routine.

Next, the torque reduction amount-deciding processing subroutine depicted in FIG. 7 will be described. This torque reduction amount-deciding processing subroutine is executed in the step S6 in FIG. 5.

Upon start of the torque reduction amount-deciding processing subroutine, in step S21, the PCM 50 operates to determine whether the vehicle attitude control is not currently being executed. As a result, when the vehicle attitude control is determined to be not being executed (step S21: YES), the processing subroutine proceeds to step S22. In the step S22, the PCM 50 operates to determine whether or not the vehicle attitude control starting condition is satisfied. Specifically, the PCM 50 operates to determine whether or not a rate of change in a steering angle (which may be a steering speed calculated based on the steering angle acquired in the step S1) is equal to or greater than the start threshold set in the step S4 in FIG. 5 (see also FIG. 6(a)). As a result, when the rate of change in the steering angle is determined to be equal to or greater than the start threshold, i.e., the vehicle attitude control starting condition is determined to be satisfied (step S22: YES), the processing subroutine proceeds to step S23. On the other hand, when the rate of change in the steering angle is determined to be less than the start threshold, i.e., the vehicle attitude control starting condition is determined to be not satisfied (step S22: NO), the processing subroutine is terminated.

Subsequently, in the step S23, the PCM 50 operates to determine whether or not the steering speed (rate of change in the steering angle) is increasing. As a result, when the steering speed is determined to be increasing (step S23: YES), the processing subroutine proceeds to step S24. In the step S24, the PCM 50 operates to set a target additional deceleration based on the steering speed. This target additional deceleration is a deceleration to be added to the vehicle according to the steering wheel operation state in order to accurately realize a vehicle behavior which is intended by a driver.

Basically, based on a relationship between target additional deceleration and steering speed, shown by the map in FIG. 8, the PCM 50 operates to obtain a value of the target additional deceleration corresponding to a current steering speed. In FIG. 8, the horizontal axis represents steering speed, and the vertical axis represents target additional deceleration. As depicted in FIG. 8, as the steering speed becomes larger, a value of the target additional deceleration corresponding to this steering speed comes closer to a given upper limit value (e.g., 1 m/s$^2$). Specifically, as the steering speed becomes larger, the target additional deceleration becomes larger, and a rate of increase of the target additional deceleration becomes smaller.

In this embodiment, the PCM 50 also operates to correct the target additional deceleration decided by the above map in FIG. 8, based on the engine speed and the engine operation mode (the reduced-cylinder operation or the all-cylinder operation). Details of this correction will be described later.

On the other hand, when the steering speed is determined in the step S23 to be not increasing (step S23: NO), i.e., when the steering speed is determined in the step S23 to be decreasing or maintained constant, the processing subroutine proceeds to step S25. In the step S25, the PCM 50 operates to decide, as a value of the additional deceleration in a current processing cycle (current-cycle additional deceleration), a value of the additional deceleration decided in the last processing cycle (last-cycle additional deceleration).

On the other hand, when the vehicle attitude control is determined in the step S21 to be being executed (step S21: NO), the processing subroutine proceeds step S26. In the step S26, the PCM 50 operates to determine whether or not the vehicle attitude control terminating condition is satisfied. Specifically, the PCM 50 operates to determine whether or not the rate of change in the steering angle is less than the termination threshold set in the step S5 in FIG. 5 (see also FIG. 6(b)). As a result, when the rate of change in the steering angle is determined to be equal to or greater than the termination threshold, i.e., the vehicle attitude control terminating condition is determined to be not satisfied (step S26: NO), the processing subroutine proceeds to step S23. In this case, the PCM 50 operates to perform the processing in the step S23 and the subsequent steps so as to continue the vehicle attitude control.

On the other hand, when the rate of change in the steering angle is determined to be less than the termination threshold, i.e., the vehicle attitude control terminating condition is determined to be satisfied (step S26: YES), the processing subroutine proceeds to step S27. In the step S27, the PCM 50 operates to obtain an amount (deceleration reduction amount) by which an additional deceleration decided in the last processing cycle (last-cycle additional deceleration) is reduced in the current processing cycle. In one example, the PCM 50 is configured to calculate the deceleration reduction amount, based on a reduction rate according to the steering speed and using a map similar to that as depicted in FIG. 8, in the same manner as that for the target additional deceleration. In another example, the PCM 50 is configured to calculate the deceleration reduction amount, based on a constant reduction rate (e.g., 0.3 m/s$^3$) preliminarily stored in a memory or the like. Further, in this embodiment, the PCM 50 is configured to correct the deceleration reduction amount calculated in this manner, based on the engine speed and the engine operation mode (the reduced-cylinder operation or the all-cylinder operation). Details of this correction will be described later.

Subsequently, in step S28, the PCM 50 operates to decide a value of the additional deceleration in the current processing cycle (current-cycle additional deceleration) by subtracting the deceleration reduction amount obtained in the step S27 from a value of the additional deceleration decided in the last processing cycle (last-cycle additional deceleration).

After completion of the step S24, S25 or S28, in step S29, the PCM 50 operates to decide a torque reduction amount, based on the current-cycle additional deceleration decided in the step S24, S25 or S28. Specifically, the PCM 50 operates to decide a value of the torque reduction amount required for realizing the current-cycle additional deceleration, based on the current vehicle speed, speed stage, road gradient and others acquired in the step S1. After completion of the processing in the step S29, the PCM 50 terminates the torque reduction amount-deciding processing subroutine, and returns to the main routine.

When the target additional deceleration is decided in the step S24 in FIG. 7, the current-cycle additional deceleration is preferably decided under a condition that an increase rate of the additional deceleration is equal to or less than a given threshold (e.g., 0.5 m/s$^3$). Specifically, the PCM 50 operates to, when an increase rate from a value of the additional deceleration decided in the last processing cycle (last-cycle additional deceleration) to the target additional deceleration decided in the step S24 in the current processing cycle is equal to or less than the given threshold, decide the target additional deceleration decided in the step S24 in the current processing cycle, as a value of the additional deceleration in the current processing cycle (current-cycle additional deceleration). On the other hand, the PCM 50 operates to, when the increase rate from the last-cycle additional deceleration to the target additional deceleration decided in the step S24 in the current processing cycle is greater than the given threshold, decide, as the current-cycle additional deceleration, a value obtained by increasing the last-cycle additional deceleration at the given threshold (increase rate) for the given cycle period.

Next, with reference to FIGS. 9(a) and 9(b), a method for correcting each of the target additional deceleration and the deceleration reduction amount in this embodiment will be described. In FIG. 9(a), the horizontal axis represents engine speed, and the vertical axis represents additional deceleration correction value (a correction value for correcting the target additional deceleration). In FIG. 9(b), the horizontal axis represents engine speed, and the vertical axis represents deceleration reduction amount correction value (a correction value for correcting the deceleration reduction amount). In FIGS. 9(a) and 9(b), the lines G31, G32 represent map data to be applied to the all-cylinder operation, and the lines G32, G42 represent map data to be applied to the reduced-cylinder operation.

Correction using these correction values is performed by multiplying each of the target additional deceleration and the deceleration reduction amount by a corresponding one of the correction values. In this example, as each of the correction values (absolute values) becomes larger, a corresponding one of the target additional deceleration and the deceleration reduction amount is corrected more largely. Correcting the target additional deceleration more largely means adding the additional deceleration to the vehicle more quickly. Further, correcting the deceleration reduction amount more largely means reducing deceleration of the vehicle more quickly, i.e., restoring the reduced engine torque to an original state before applying deceleration to the vehicle, more quickly.

As depicted in FIG. 9(a), in this embodiment, the additional deceleration correction value is set such that it becomes larger as the engine speed becomes lower. In addition, the additional deceleration correction value in the reduced-cylinder operation is set to be greater than that in the all-cylinder operation. In this embodiment, when the engine speed is relatively low and the engine operation mode is the reduced-cylinder operation, i.e., the number of times of combustion per unit time in the engine 10 is relatively small, the additional deceleration correction value is increased to increase a rate of change in the target additional deceleration and thus increase a rate of change in the engine torque being reduced to thereby suppress deterioration in responsivity of torque reduction in the starting stage of the vehicle attitude control.

Further, as depicted in FIG. 9(b), in this embodiment, the deceleration reduction amount correction value is set such that it becomes larger as the engine speed becomes lower. In addition, the deceleration reduction amount correction value in the reduced-cylinder operation is set to be greater than that in the all-cylinder operation. In this embodiment, when the engine speed is relatively low and the engine operation mode is the reduced-cylinder operation, i.e., the number of times of combustion per unit time in the engine 10 is relatively small, the deceleration reduction amount correction value is increased to increase a rate of change in the deceleration reduction amount and thus increase a rate of change in the engine torque being restored to thereby suppress deterioration in responsivity of torque restoration in the terminating stage of the vehicle attitude control.

In FIGS. 9(a) and 9(b), each of the additional deceleration correction value and the deceleration reduction amount correction value is continuously changed according to the engine speed. Alternatively, each of the additional deceleration correction value and the deceleration reduction amount correction value may be changed in a stepwise manner, according to the engine speed. As one example, each of the additional deceleration correction value and the deceleration reduction amount correction value may be changed in a stepwise manner, depending on whether the engine speed is less than a given value or equal to or greater than the given value.

<Functions/Advantageous Effects>

Next, with reference to FIGS. 10(a) to 10(f), functions/advantageous effects of the control device according to this embodiment will be described. FIGS. 10(a) to 10(f) are time charts presenting temporal changes in parameters pertaining to engine control to be performed when a vehicle equipped with the control device according to this embodiment turns by a steering wheel operation. FIGS. 10(a) to 10(f) illustrate a situation where the vehicle is turning in a clockwise direction. Further, assume that the engine speed is relatively low, and the engine 10 is performing the reduced-cylinder operation.

FIG. 10(a) is a chart presenting a change in steering angle of the vehicle which is turning in the clockwise direction. In FIG. 10(a), the horizontal axis represents time, and the vertical axis represents steering angle. As depicted in FIG. 10(a), clockwise steering is started, and then, along with an additional turning operation of the steering wheel, a clockwise steering angle gradually increases and reaches a maximum value. Subsequently, the steering angle is maintained constant.

FIG. 10(b) is a chart presenting a change in steering speed of the vehicle which is turning in the clockwise direction as depicted in FIG. 10(a). In FIG. 10(b), the horizontal axis represents time, and the vertical axis represents steering speed. The steering speed is expressed as a temporal differential value of the steering angle of the vehicle. That is, as depicted in FIG. 10(b), when clockwise steering is started, a clockwise steering speed arises and is maintained approximately constant. Then, when the clockwise steering speed decreases and the clockwise steering angle reaches the maximum value, the steering speed becomes 0. Then, during a period in which the clockwise steering angle is maintained, the steering speed is kept at 0.

FIG. 10(c) is a chart presenting a change in additional deceleration decided based on the steering speed depicted in FIG. 10(b). In FIG. 10(c), the horizontal axis represents time, and the vertical axis represents additional deceleration. In FIG. 10(c), the solid line indicates an additional deceleration applied to this embodiment, and the broken line indicates an additional deceleration applied to a comparative example (this definition will also be applied to FIGS. 10(d) to 10(f)).

In the comparative example, the start and termination timings of the vehicle attitude control were determined using a constant start threshold and a constant termination threshold, to start to change the additional deceleration, and the additional deceleration was decided based on only the steering speed (e.g., the additional deceleration is decided using only the map depicted in FIG. 8).

On the other hand, in this embodiment, the start and termination timings of the vehicle attitude control were determined using the start threshold and the termination threshold which are changed based on the engine speed and the engine operation mode (the reduced-cylinder operation or the all-cylinder operation), to start to change the additional deceleration, and the additional deceleration decided based on the steering speed in the same manner as that in the comparative example was corrected based on the engine speed and the engine operation mode (the reduced-cylinder operation or the all-cylinder operation).

Basically, the PCM 50 operates to, upon satisfaction of the vehicle attitude control starting condition that the rate of change in the steering angle is equal to or greater than the start threshold, start the vehicle attitude control to start to increase the additional deceleration (absolute value). In this process, the PCM 50 in this embodiment operates to set the start threshold to a relatively small value appropriate to the driving state in which the engine speed is relatively low and the engine 10 is performing the reduced-cylinder operation (see FIG. 6(a)). Thus, in the comparative example where the start threshold is not changed, an increase in the additional deceleration is stated at time t2, whereas in this embodiment, the increase in the additional deceleration is stated at time t1 earlier than the time t2 in the comparative example.

Then, the PCM 50 basically operates to decide the target additional deceleration according to the steering speed, with reference to the map as depicted in FIG. 8. In this process, the PCM 50 in this embodiment operates to set a correction value (additional deceleration correction value) for correcting the target additional deceleration to a relatively large value appropriate to the driving state in which the engine speed is relatively low and the engine 10 is performing the reduced-cylinder operation (see FIG. 9(a)), and correct the target additional deceleration using the set additional deceleration correction value. Thus, in this embodiment, a rate (rapidity, slope) of change in the additional deceleration being increased is set to a relatively large value, as compared to the comparative example where the target additional deceleration according to the steering speed is not corrected (see the solid line and the broken line in FIG. 10(c)).

Subsequently, when the steering speed becomes approximately constant, the PCM 50 operates to maintain the additional deceleration. Then, the PCM 50 operates to, upon satisfaction of the vehicle attitude control terminating condition that the rate of change in the steering angle is less than the termination threshold, start to reduce the additional deceleration (absolute value) so as to terminate the vehicle attitude control. In this process, the PCM 50 in this embodiment operates to set the termination threshold to a relatively large value appropriate to the driving state in which the engine speed is relatively low and the engine 10 is performing the reduced-cylinder operation (see FIG. 6(b)). Thus, in the comparative example where the termination threshold is not changed, a reduction in the additional deceleration is stated at time t4, whereas in this embodiment, the reduction in the additional deceleration is stated at time t3 earlier than the time t4 in the comparative example (see the solid line and the broken line in FIG. 10(c)).

Then, the PCM 50 basically operates to decide the deceleration reduction amount according to the steering speed, with reference to a given map. In this process, the PCM 50 in this embodiment operates to set a correction value (deceleration reduction amount correction value) for correcting the deceleration reduction amount to a relatively large value appropriate to the driving state in which the engine speed is relatively low and the engine 10 is performing the reduced-cylinder operation (see FIG. 9(*b*)), and correct the deceleration reduction value using the set deceleration reduction amount correction value. Thus, in this embodiment, a rate (rapidity, slope) of change in the deceleration reduction amount being reduced is set to a relatively large value, as compared to the comparative example where the deceleration reduction amount is not corrected (see the solid line and the broken line in FIG. 10(*c*)).

Figure 10:
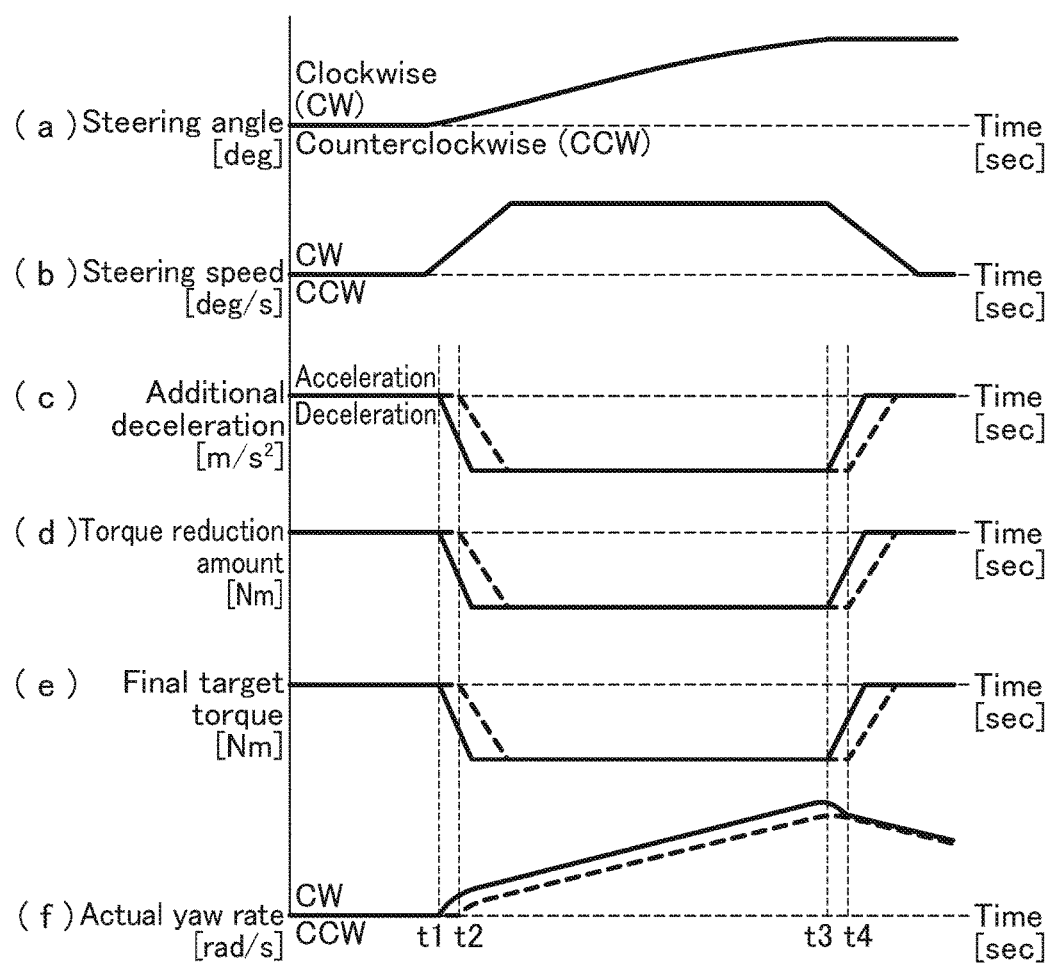
FIGS. 10(a) to 10(f) are time charts for illustrating functions/effects of the control device according to this embodiment.

FIG. 10(*d*) is a chart presenting a change in the torque reduction amount decided based on the additional deceleration depicted in FIG. 10(*c*). In FIG. 10(*c*), the horizontal axis represents time, and the vertical axis represents torque reduction amount. The PCM 50 operates to decide a value of the torque reduction amount required for realizing the additional deceleration, based on parameters such as current vehicle speed, speed stage and road gradient. Thus, in the case where respective values of these parameters are constant, the torque reduction amount is decided such that it changes in the same pattern as that of the additional deceleration depicted in FIG. 10(*c*) (see the solid line and the broken line in FIG. 10(*d*)).

FIG. 10 (*e*) is a chart presenting a change in a final target torque decided based on the basic target torque and the torque reduction amount. In FIG. 10 (*e*), the horizontal axis represents time, and the vertical axis represents torque. The PCM 50 operates to subtract the torque reduction amount decided through the torque reduction amount-deciding processing subroutine from the basic target torque (assuming that the basic target torque is approximately constant), to thereby decide the final target torque. Thus, the change in the torque reduction amount depicted in FIG. 10(*d*) is reflected on the final target torque (see the solid line and the broken line in FIG. 10(*e*)).

FIG. 10(*f*) is a chart presenting a change in a yaw rare (actual yaw rate) generated when control of the engine 10 is performed so as to realize the final target torque in the vehicle which is steered as depicted in FIG. 10(*a*). In FIG. 10(*f*), the horizontal axis represents time, and the vertical axis represents yaw rate.

Basically, after clockwise steering is started, when the torque reduction amount is increased along with an increase in clockwise steering speed, a load applied to the front road wheels as steerable road wheels of the vehicle is increased. As a result, a frictional force between each of the front road wheels and a road surface is increased, and a cornering force of the front road wheels is increased, thereby providing an improved turn-in ability of the vehicle. Subsequently, the torque reduction amount is maintained at its maximum value. Thus, it becomes possible to maintain the load applied to the front road wheels and keep up the turn-in ability of the vehicle, as long as the tuning of the steering wheel is continued. Subsequently, the torque reduction amount is smoothly reduced. Thus, in response to completion of the turning of the steering wheel, the load applied to the front road wheels can be gradually reduced to gradually reduce the cornering force of the front road wheels, thereby restoring the output torque of the engine 10, while stabilizing a vehicle body.

In this embodiment, in the starting stage of the vehicle attitude control, an increase in the additional deceleration is started more quickly (i.e., the torque reduction is started more quickly), as compared to the comparative example, and a rate of change in the additional deceleration being increased is set to a larger value (a rate of change in the torque reduction is set to a larger value), as compared to the comparative example, so that the actual yaw rate is increased more quickly, and a rate of change in the actual yaw rate being increased is set to a larger value, as compared to the comparative example (see the solid line and the broken line in FIG. 10(*f*)). This example is based on the assumption that the engine speed is relatively low and the engine 10 is performing the reduced-cylinder operation. Thus, in the comparative example designed without taking into account such a driving state, responsivity of torque reduction in the starting stage of the vehicle attitude control tends to deteriorate, causing delay in increase of the actual yaw rate, for the reason mentioned in the "Technical Problem". In contrast, in this embodiment, considering the driving state in which the engine speed is relatively low and the engine 10 is performing the reduced-cylinder operation, the start threshold for the vehicle attitude control is set to a relatively small value and the rate of change in the additional deceleration being increased is corrected to become larger, so that it becomes possible to improve the responsivity of torque reduction in the starting stage of the vehicle attitude control to enable the actual yaw rate to be quickly increased.

Further, in this embodiment, in the terminating stage of the vehicle attitude control, a reduction in the additional deceleration is started more quickly (i.e., the torque restoration is started more quickly), as compared to the comparative example, and a rate of change in the additional deceleration being reduced is set to a larger value (a rate of change in the torque restoration is set to a larger value), as compared to the comparative example, so that the actual yaw rate is reduced more quickly, and a rate of change in the actual yaw rate being reduced is set to a larger value, as compared to the comparative example (see the solid line and the broken line in FIG. 10(*f*)). This example is based on the assumption that the engine speed is relatively low and the engine 10 is performing the reduced-cylinder operation. Thus, in the comparative example designed without taking into account such a driving state, responsivity of torque restoration in the terminating stage of the vehicle attitude control tends to deteriorate, causing delay in reduction of the actual yaw rate, for the reason mentioned in the "Technical Problem". In contrast, in this embodiment, considering the driving state in which the engine speed is relatively low and the engine 10 is performing the reduced-cylinder operation, the termination threshold for the vehicle attitude control is set to a relatively large value and the rate of change (restoration) in the additional deceleration being reduced is corrected to become larger, so that it becomes possible to improve the responsivity of torque restoration in the terminating stage of the vehicle attitude control to enable the actual yaw rate to be quickly reduced.

<Modifications>

In the above embodiment, the present invention is applied to the engine 10 (four-cylinder engine) to be operated in only two operation modes: a reduced-cylinder operation mode and an all-cylinder operation mode. This engine 10 is configured such that, during the reduced-cylinder operation, two of the cylinders 2A to 2D are deactivated, and only the remaining two cylinders are activated. Alternatively, the present invention can be applied to any other cylinder deactivatable engine configured to be operated in two or more operation modes. For example, the present invention can be applied to a six-cylinder engine configured to be operated in three operation modes consisting of: an all-cylinder operation where all of six cylinders are activated; a first reduced-cylinder operation in which two of the six cylinders are deactivated, and the remaining four cylinders are activated; and a second reduced-cylinder operation in which three of the six cylinders are deactivated, and the remaining three cylinders are activated.

When the present invention is applied to such a cylinder deactivatable engine configured to be operated in two or more operation modes, the control device may be configured such that each of the vehicle attitude control starting (executing) condition and the vehicle attitude control terminating condition may be relaxed to a larger degree as the numbed of deactivated cylinders becomes larger. That is, as the numbed of deactivated cylinders becomes larger, the start threshold may be set to a smaller value, and the termination threshold may be set to a larger value. Further, the rate of change in each of the engine torque being reduced and the engine torque being restored may be set to become larger as the numbed of deactivated cylinders becomes larger. That is, each of the additional deceleration correction value and the deceleration reduction amount correction value may be set to become larger as the numbed of deactivated cylinders becomes larger.

In the above embodiment, relaxation in each of the vehicle attitude control starting (executing) condition and the vehicle attitude control terminating condition is executed. However, the present invention is not limited to executing such relaxation. For example, without relaxing the vehicle attitude control starting condition, the responsivity of torque restoration in the starting stage of the vehicle attitude control can be sufficiently improved by setting the rate of change in the engine torque being reduced to a relatively large value in the starting stage of the vehicle attitude control.

Specifically, if the vehicle attitude control starting condition is not relaxed in a situation where the number of times of combustion per unit time in the engine 10 is relatively small, a start timing of the vehicle attitude control tends to be delayed, as compared to a situation where the number of times of combustion per unit time in the engine 10 is relatively large. However, even if the start timing of the vehicle attitude control is delayed, it is possible to increase the rate of change in the engine torque being reduced, so as to catch up to a level of engine torque to be obtained in the case where the start timing of the vehicle attitude control is not delayed, thereby ensuring the responsivity of torque reduction in the starting stage of the vehicle attitude control.

Further, in the above embodiment, each of the rate of change in the engine torque being reduced in the stating stage of the vehicle attitude control, and the rate of change in the engine torque being restored in the terminating stage of the vehicle attitude control is set to a relatively large value. However, it is possible to omit to set the rate of change in the engine torque being restored to a relatively large value in the terminating stage of the vehicle attitude control.

In the above embodiment, the vehicle attitude control (torque reduction control) is executed based on the steering angle and the steering speed. Alternatively, the torque reduction control may be executed based on a yaw rate or a lateral acceleration, instead of the steering angle and the steering speed. The steering angle, steering speed, yaw rate and lateral acceleration are examples of "steering angle-related value" as set forth in the appended claims.

LIST OF REFERENCE SIGNS

1: intake passage
2 (2A to 2D): cylinder
5: throttle valve
10: engine
13: fuel injector
14: spark plug
18: intake variable valve timing mechanism
20: valve stopping mechanism
30: accelerator position sensor
39: vehicle speed sensor
50: PCM
51: vehicle attitude control part
53: condition relaxation part
55: torque reduction change rate-setting part
57: torque restoration change rate-setting part
100: engine control system

The invention claimed is:

1. A control device for a vehicle, comprising:
an engine;
a memory; and
a processor configured to execute instructions stored on the memory to perform the functions of
adjusting an output torque of the engine; and
upon satisfaction of a condition that the vehicle is traveling, and that a steering angle-related value pertaining to a steering angle of a steering system is increasing, reducing the engine output torque to thereby generate deceleration of the vehicle so as to control vehicle attitude,
wherein the processor is further configured to set a rate of change in the engine output torque being reduced, such that the rate of change becomes larger as the number of times of combustion per unit time in the engine becomes smaller, and
to reduce the engine output torque according to the rate of change set by the processor, and
to employ, as a sub-condition that the steering angle-related value is increasing, a condition that a rate of change in a steering angle of a steering wheel operated by a driver is equal to or greater than a given value.

2. The control device as recited in claim 1,
wherein the engine is provided with a plurality of cylinders and capable of performing a reduced-cylinder operation in which a part of the plurality of cylinders are deactivated so as to cease combustion therein, and
wherein the processor is configured to set the rate of change in the engine output torque being reduced, such that the rate of change becomes larger as the number of deactivated cylinders among the plurality of cylinders becomes larger.

3. The control device as recited in claim 1,
wherein the vehicle is further equipped with an engine speed detection device configured to detect an engine speed of the engine, and
wherein the processor is configured to set the rate of change in the engine output torque being reduced, such that the rate of change becomes larger as the engine speed becomes lower.

4. The control device as recited in claim 1,
wherein the vehicle is further equipped with a steering angle sensor configured to detect a steering angle of the steering system, and
wherein the processor is configured to employ, as a sub-condition that the steering angle-related value is increasing, a condition that a rate of change in a steering angle detected by the steering angle sensor is equal to or greater than a given value.

5. A control device for a vehicle, comprising:
an engine;
a memory; and
a processor configured to execute instructions stored on the memory to perform the functions of
adjusting an output torque of the engine; and
upon satisfaction of a condition that the vehicle is traveling, and that a steering angle-related value pertaining to a steering angle of a steering system is increasing, reducing the engine output torque to thereby generate deceleration of the vehicle so as to control vehicle attitude,
wherein the processor is further configured, when the number of times of combustion per unit time in the engine is a first value, to set a rate of change in the engine output torque being reduced, such that the rate of change becomes larger, as compared with when the number of times of combustion per unit time in the engine is a second value greater than the first value,
to reduce the engine output torque according to the rate of change set by the processor, and
to employ, as a sub-condition that the steering angle-related value is increasing, a condition that a rate of change in a steering angle of a steering wheel operated by a driver is equal to or greater than a given value.

6. A control device for a vehicle, comprising:
an engine;
a memory; and
a processor configured to execute instructions stored on the memory to perform the functions of
adjusting an output torque of the engine; and
upon satisfaction of a condition that the vehicle is traveling, and that a steering angle-related value pertaining to a steering angle of a steering system is increasing, reducing the engine output torque to thereby generate deceleration of the vehicle so as to control vehicle attitude;
wherein the engine is provided with a plurality of cylinders and capable of switchably performing one of a reduced-cylinder operation in which a part of the plurality of cylinders are deactivated so as to cease combustion therein, and an all-cylinder operation in which combustion is performed in all of the plurality of cylinders,
wherein the processor is further configured, when the engine is performing the reduced-cylinder operation, to set a rate of change in the engine output torque being reduced, such that the rate of change becomes larger, as compared to when the engine is performing the all-cylinder operation,
to reduce the engine output torque according to the rate of change set by the processor, and
to employ, as a sub-condition that the steering angle-related value is increasing, a condition that a rate of change in a steering angle of a steering wheel operated by a driver is equal to or greater than a given value.

* * * * *